United States Patent
Jung et al.

(10) Patent No.: US 8,391,860 B2
(45) Date of Patent: Mar. 5, 2013

(54) METHOD FOR MANAGING NEIGHBOR FEMTO BS LIST IN A BROADBAND WIRELESS ACCESS SYSTEM

(75) Inventors: In Uk Jung, Gyeonggi-do (KR); Jin Lee, Gyeonggi-do (KR); Yong Ho Kim, Gyeonggi-do (KR); Ki Seon Ryu, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 80 days.

(21) Appl. No.: 12/788,076

(22) Filed: May 26, 2010

(65) Prior Publication Data

US 2010/0304743 A1    Dec. 2, 2010

Related U.S. Application Data

(60) Provisional application No. 61/181,271, filed on May 26, 2009.

(30) Foreign Application Priority Data

Apr. 2, 2010   (KR) ......................... 10-2010-0030297

(51) Int. Cl.
G06F 15/16       (2006.01)

(52) U.S. Cl. ..................................... 455/434; 455/414.1

(58) Field of Classification Search ............... 455/414.1, 455/434; 370/208, 280, 328, 401
See application file for complete search history.

(56) References Cited

U.S. PATENT DOCUMENTS

2009/0005099 A1    1/2009   Jung et al.
2010/0110950 A1*   5/2010   Kone et al. ................ 370/311

FOREIGN PATENT DOCUMENTS

KR    10-2008-0097690 A    11/2008
KR    10-2009-0026877 A    3/2009
WO    WO 2009/021213 A2    2/2009

* cited by examiner

*Primary Examiner* — Sam Bhattacharya
(74) *Attorney, Agent, or Firm* — Birch, Stewart, Kolasch & Birch, LLP

(57) ABSTRACT

A method for updating a neighbor list at a femto Base Station (BS) is disclosed. The method includes broadcasting a first broadcast message including information about an unavailable time interval during which scheduling is not performed for Mobile Stations (MSs), scanning at least one neighbor BS during the unavailable time interval, and updating the neighbor list according to a result of the scanning.

13 Claims, 7 Drawing Sheets

METHOD FOR MANAGING NEIGHBOR FEMTO BS LIST IN A BROADBAND WIRELESS ACCESS SYSTEM

This application claims the benefit of Korean Patent Application No. 10-2010-0030297, filed on Apr. 2, 2010, which is hereby incorporated by reference as if fully set forth herein.

This application also claims the benefit of U.S. Provisional Application Ser. No. 61/181,271, filed on May 26, 2009, the contents of which are hereby incorporated by reference in their entirety.

BACKGROUND OF THE INVENTION

1. Field of the Invention

The present invention relates to a broadband wireless access system, and more particularly, to a method for managing a neighbor Base Station (BS) list by efficiently scanning neighbor BSs at a Femto BS (FBS).

2. Discussion of the Related Art

Conventionally, A femtocell will be described in brief.

Femto is a prefix in the metric system, denoting a factor of $10^{-15}$. Hence a femtocell or FBS refers to an ultra-small indoor Access Point (AP) for low-power home use or office use. Although the term "femtocell" is sometimes interchangeably used with "picocell", the former is used in the sense of a more advanced cell. The FBS is a small cellular BS connected to a broadband router and functions to connect $2^{nd}$ Generation (2G) and $3^{rd}$ Generation (3G) voice and data to a backbone network of a mobile communication service provider via the Digital Subscriber Line (DSL).

An investigation report was released, saying that FBSs would accelerate 3G proliferation and could be a driving force behind expansion of indoor coverage. It is forecast that by 2011, there will be 102 million users of femtocell products and 32 million APs worldwide. According to chief analyst of ABI Research, Stuart Carlaw, "From a technological standpoint, their better in-building coverage for technologies such as WCDMA, HSDPA and EVDO is an incredibly important aspect of service delivery. From a strategic and financial standpoint, the routing of traffic through the IP network significantly enhances network quality and capacity, and reduces the OPEX that carriers expend on backhaul."

Femtocells can expand cell coverage and increase the quality of voice service. Mobile communication service providers are expecting that subscribers may be familiar with 3G by providing data service via femtocells. The femtocells are also called FBSs or femto Base Transceiver Stations (BTSs).

In summary, femtocells offer the following benefits.
1. Cell coverage improvement
2. Infrastructure cost decrease
3. New service offering
4. Fixed Mobile Convergence (FMC) acceleration.

One or more femtocells may be grouped on a service basis or geological area basis. For example, a femtocell group that allows access to a restricted group of Mobile Stations (MSs) is called a Closed Subscriber Group (CSG). An FBS allows access only to an MS that has subscribed to the CSG by checking the CSG Identifier (ID) of the MS.

FIG. 1 illustrates an exemplary network configuration including FBSs.

FBSs are new network entities added to a legacy network. Accordingly, the use of FBSs may bring about additions or modifications to an entire network structure. An FBS may directly access the Internet and function as a BS. Therefore, the FBS can perform almost all functions of a macro BS. In addition, the FBS may relay data from the macro BS to MSs.

In FIG. 1, the network is configured by adding a Femto Network Gateway (FNG) to the legacy network. The FNG may communicate with an Access Service Network (ASN) gateway and a Connectivity Service Network (CSN). The FNG may use an Rx interface for communicating with the ASN and an Ry interface for communicating with the CSN.

An FBS may access directly a Transmission Control Protocol/Internet Protocol (TCP/IP) Internet and receive a service from the CSN via the FNG. An MS connected to the FBS may receive services from the FNG or CSN in relation to IP Multimedia Subsystem (IMS) authentication, etc.

The FBS is connected to an AP via an R1 interface. This means that the FBS may receive a downlink channel from a macro BS. The FBS may also transmit a control signal to the macro BS.

Once an FBS is installed, it may acquire a location-based neighbor list from a core network. Because this neighbor list is made based on location information of the FBS, only physical distances are considered for the neighbor list, with no regard to the presence or absence of obstacles or channel states that affect wireless communication between the FBS and neighbor BSs. Accordingly, there exists a need for a method for managing a neighbor list more efficiently and accurately at an FBS.

SUMMARY OF THE INVENTION

Accordingly, an object of the present invention devised to solve the problem lies on a method for efficiently managing a neighbor list at a Femto Base Station (FBS).

Another object of the present invention devised to solve the problem lies on a method for efficiently scanning neighbor BSs at an FBS.

It will be appreciated by persons skilled in the art that that the objects that could be achieved with the present invention are not limited to what has been particularly described hereinabove and the above and other objects that the present invention could achieve will be more clearly understood from the following detailed description taken in conjunction with the accompanying drawings.

The object of the present invention can be achieved by providing a method for updating a neighbor list at a femto BS, including broadcasting a first broadcast message including information about an unavailable time interval during which scheduling is not performed for MSs, scanning at least one neighbor BS during the unavailable time interval, and updating the neighbor list according to a result of the scanning.

For the scanning, preamble may be received from the at least one neighbor BS.

The information about the unavailable time interval may include an Unavailable Start Time (UST) field indicating a start of the unavailable time interval and an Unavailable Time Interval (UTI) field indicating the unavailable time interval.

The method may further include broadcasting a second broadcast message including the updated neighbor list.

The method may further include reporting at least part of information about the updated neighbor list to a Self Organizing Network (SON) server.

The first broadcast message may be an Advanced Air Interface Self Organizing Network Advertisement (AAI_SON-ADV) message and the second broadcast message may be an Advanced Air Interface Neighbor Advertisement (AAI_NBR-ADV) message.

The unavailable time interval may be set not to overlap with a Low Duty Cycle (LDC) of a neighbor femto BS.

In another aspect of the present invention, provided herein is a femto BS including a processor, and a Radio Frequency (RF) module for transmitting and receiving RF signals in the air interface under the control of the processor. The processor controls a first broadcast message including information about an unavailable time interval during which scheduling is not performed for MSs to be broadcast, controls at least one neighbor BS to be scanned during the unavailable time interval, and controls the neighbor list to be updated according to a result of the scanning.

The processor may control the at least one neighbor BS to be scanned by receiving a preamble from the at least one neighbor BS.

The information about the unavailable time interval may include a UST field indicating a start of the unavailable time interval and a UTI field indicating the unavailable time interval.

The processor may control a second broadcast message including the updated neighbor list to be further broadcast.

The first broadcast message may be an AAI_SON-ADV message and the second broadcast message may be an AAI_NBR-ADV message.

The processor may set the unavailable time interval not to overlap with an LDC of a neighbor femto BS.

The embodiments of the present invention have the following effects.

An FBS can efficiently manage a neighbor list in a wireless access system supporting femtocells.

An MS can avoid unnecessary scanning for an FBS or prevent a scanning-incurred data transmission delay.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Figure 1:
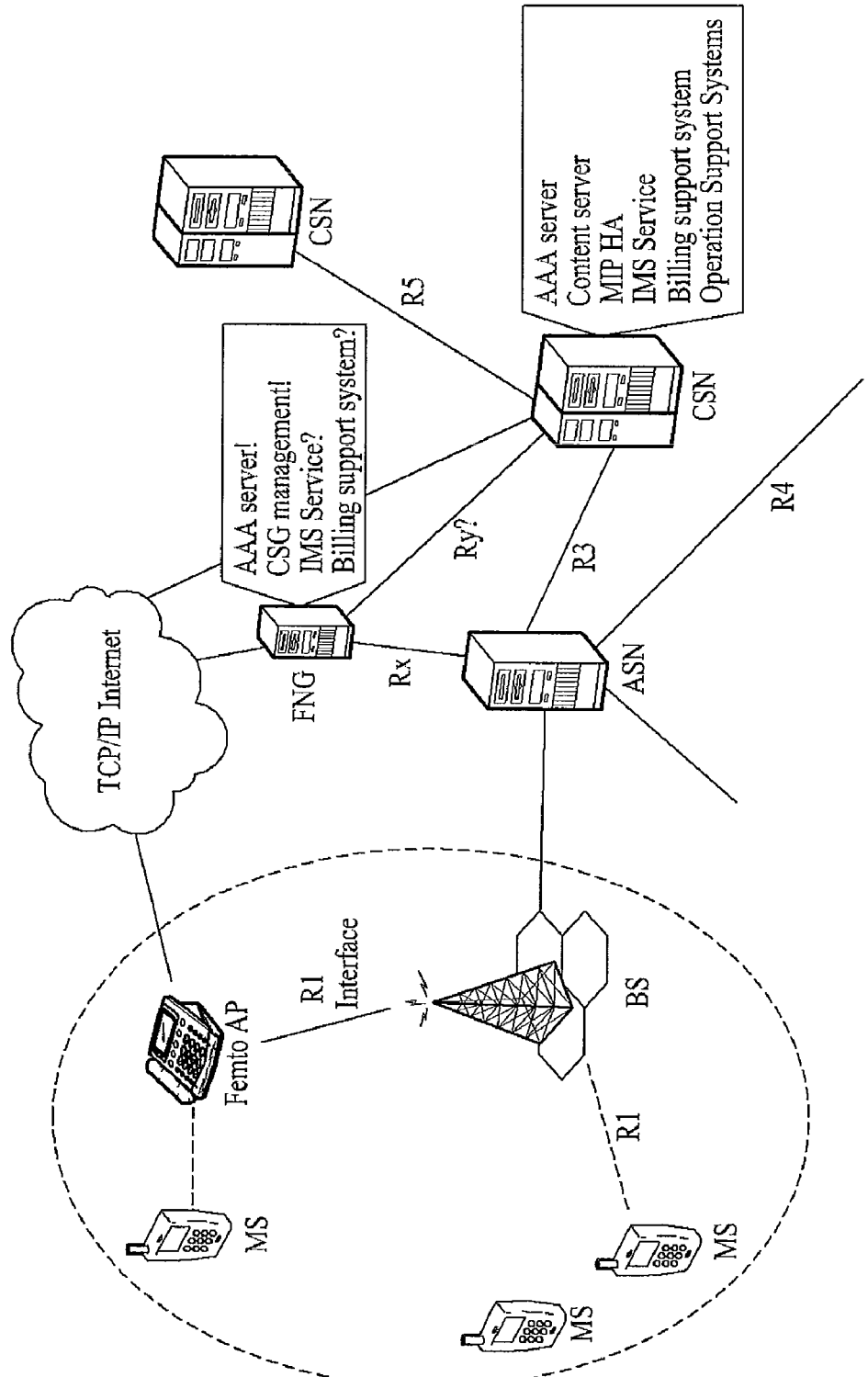
FIG. 1 illustrates an exemplary network configuration including Femto Base Stations (FBSs).

The present invention relates to a wireless access system. The present invention provides a method for managing a neighbor Base Station (BS) list efficiently at a Femto Base Station (FBS).

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of drawings, procedures or steps, which can be understood by those skilled in the art, are not explained.

In exemplary embodiments of the present invention, a description is made of a data transmission and reception relationship between a BS and a Mobile Station (MS). Herein, the term 'BS' refers to a terminal node of a network, which communicates directly with the MS. In some cases, a specific operation described as performed by the BS may be performed by an upper node of the BS.

Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'eNode B (eNB)', 'access point', 'Advanced Base Station (ABS) etc. The term 'MS' may be replaced with the term 'User Equipment (UE)', 'Subscriber Station (SS')', 'Mobile Subscriber Station (MSS)', 'mobile terminal', 'Advanced Mobile Station (AMS)', etc.

A transmitter means a node that transmits voice or data service and a receiver means a node that receives voice or data service. Hence, an MS may be a transmitter and a BS may be a receiver, on an uplink. Likewise, the MS may be a receiver and the BS may be a transmitter, on a downlink.

Meanwhile, the MS may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, etc.

Exemplary embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, a procedure, a function, etc. performing the above-described functions or operations. A software code may be stored in a memory unit and executed by a processor. The memory unit is located at the interior or exterior of the processor and may transmit and receive data to and from the processor via various known means.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminologies used herein may be supported by at least one of P802.16-2004, P802.16e-2005, and P802.16Rev2 documents which are the standards of IEEE 802.16.

Specific terms used for the exemplary embodiments of the present invention are provided to help the understanding of the present invention. These specific terms may be replaced with other terms within the scope and spirit of the present invention.

According to the present invention, an FBS may be located within an entire network, the coverage area of at least one Macro Base Station (MBS), a macro cell, or the area of at least one paging group.

Herein, the term "neighbor list" refers to a set of neighbor BSs to which an MS may perform handover directly from a serving BS. In other words, the neighbor list is a set of one-hop neighbor BSs. MBSs, relay stations, and FBSs may be included in the neighbor list.

Conventional Acquisition of Femtocell Network Topology in IEEE 802.16m System

A description will first be made of a conventional method for acquiring a femtocell network topology passively.

An MBS broadcasts information about FBSs that belong to an overlay network to AMSs by an Advanced Air Interface Neighbor Advertisement (AAI_NBR-ADV) message. Each FBS may broadcast a list of neighbor BSs around it to AMSs. A neighbor list that the MBS broadcasts over the overlay network may be different from the neighbor list that the FBS broadcasts. The overlay network includes information about BSs within its coverage area or information about BSs neighboring to the coverage area in the neighbor list. On the other hand, the FBS includes information about BSs within its coverage area, BSs neighboring to the coverage area, and neighbor BSs from which the FBS receives signals.

In accordance with a conventional method for actively acquiring a femtocell network topology, an AMS broadcasts a signal advertising its existence. Thus FBSs may be aware of the existence of the AMS and request the AMS to scan neighbor BSs. On the other hand, an FBS may broadcast a signal advertising its existence so that MSs around the FBS are aware of the existence of the FBS and perform an additional operation (e.g. handover, scanning, etc.)

To acquire information about neighbor BSs and manage a neighbor list based on the acquired neighbor BS information, an FBS may acquire information about a current network topology by requesting the network topology information to a core network or an AMS. However, these two methods have drawbacks.

First of all, in the case where the FBS receives information about the neighbor BSs from the core network, it may fail to receive an actually optimized neighbor list. Although the neighbor list that the core network provides to the FBS has been made based on location information received from the FBS, there is no guarantee that location information is proportional or inversely proportional to channel state in a radio communication environment. More specifically, if there is an obstacle that affects wireless communication in the middle in spite of nearby BSs, these BSs may be neighbor BSs geographically but not in terms of channel state.

Another drawback with the above methods is that in the case where the FBS requests a neighbor list to MSs, that is, the FBS requests MSs to scan neighbor BSs in order to manage a neighbor list, there may be loss on the part of the MSs, which will be described below with reference to FIG. 2.

Figure 2:
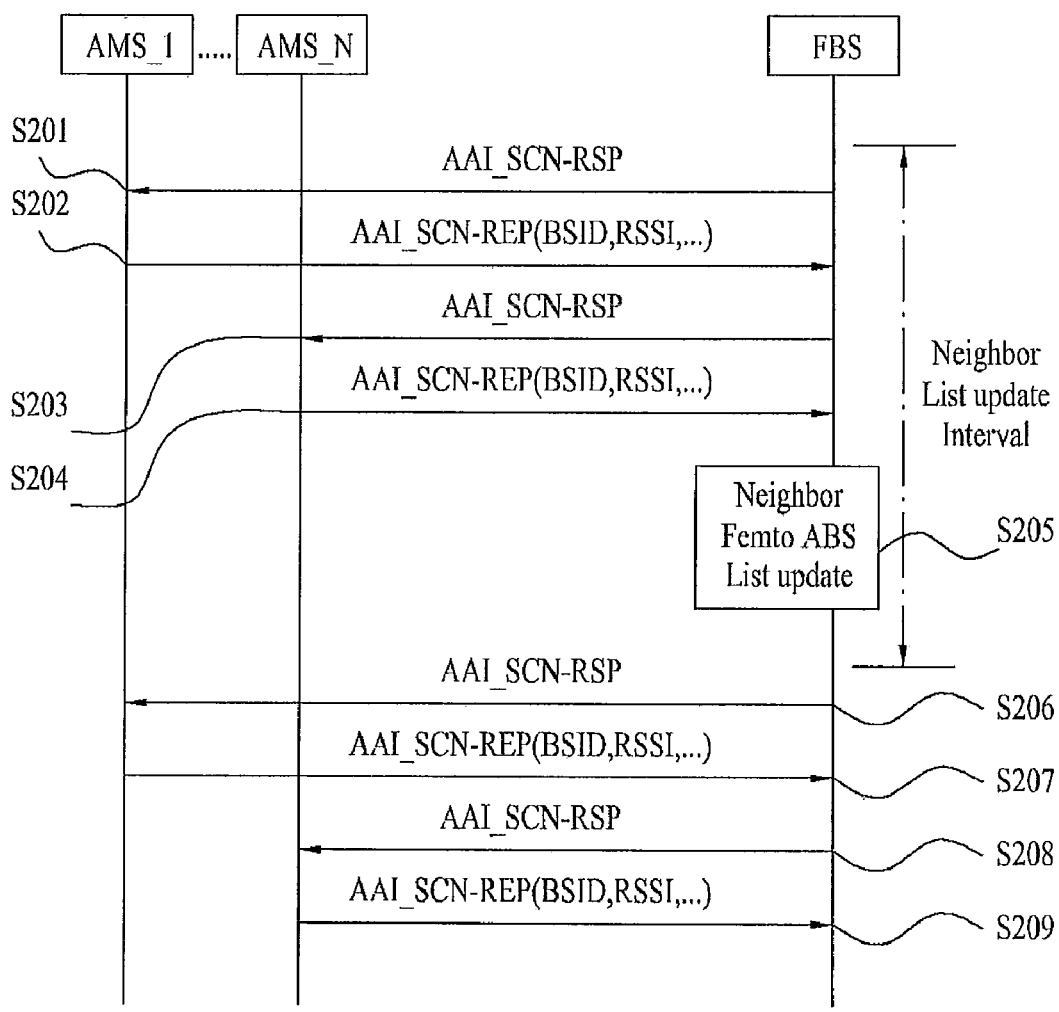
FIG. 2 is a diagram illustrating a signal flow for a conventional procedure for requesting scanning to a Mobile Station (MS) by an FBS.

FIG. 2 is a diagram illustrating a signal flow for a conventional procedure for requesting scanning to AMSs by an FBS.

Referring to FIG. 2, an FBS may request AMSs that it serves to scan neighbor BSs irrespective of a neighbor list that it broadcast in an Advanced Air Interface Neighbor Advertisement (AAI_NBR-ADV) message by transmitting an Advanced Air Interface Scanning Response (AAI_SCN-RSP) message to AMSs AMS_1 to AMS_n during a neighbor list update interval in steps S201 and S203.

The FBS may receive Advanced Air Interface Scan Report (AAI_SCN-REP) messages from the AMSs AMS_1 to AMS_n as a response to the AAI_SCN-RSP message in steps S202 and S204.

Each AAI_SCN-REP message may include IDs (BSIDs) of neighbor BSs detected by scanning and Received Signal Strength Indicators (RSSIs) of the neighbor BSs.

The FBS may update its neighbor list based on the information reported by the AMS AMS_1 to AMS_n in step S205.

Considering that the network topology of the FBS is more variable than that of a macro cell, the scanning request is preferably transmitted periodically. Accordingly, the FBS may repeat steps S201 to S205 periodically or when needed in steps S206 to S209.

As described above, the AMSs that receive services within the coverage area of the FBS should periodically perform scanning useless to them, only in behalf of the FBS. If neighbor FBSs are operating in Low Duty Mode (LDM), scanning may cause more overhead than usual. As a consequence, an additional delay may be created during data exchange.

Embodiment 1

To avoid the above-described inefficient neighbor list management, an FBS detects neighbor BSs (for the most part, FBSs) by attempting scanning on its own according to an embodiment of the present invention.

When the FBS is providing services successfully to AMSs in active state, that is, by a normal operation, it should notify the AMSs of an intended scanning time and scanning interval in order to scan neighbor BSs. This is because the FBS cannot provide services to the AMSs during the scanning interval. A time interval during which the FBS discontinues AMS scheduling and scans neighbor BSs on its own will be referred to as a "Scanning Interval (SCI)" or an "Unavailable Time Interval (UTI)". A time interval during which the FBS can provide normal services to AMSs without scanning neighbor BSs will be referred to as a "normal interval".

The AMSs may be scheduled to exchange data during the normal interval or to scan or range another BS during the SCI based on information about the normal interval and the SCI.

The FBS may signal the SCI to the AMSs by a Media Access Control (MAC) management message. The MAC management message may be unicast or broadcast to the AMSs. An Advanced Air Interface Self Organizing Network Advertisement (AAI_SON-ADV) message may used as the MAC management message, by way of example.

Table 1 below illustrates an exemplary format of the AAI_SON-ADV message.

TABLE 1

| Name | Value | Usage |
|---|---|---|
| Action type | Used to indicate the purpose of this message<br>0b00: ABS Reconfiguration<br>0b01: ABS Restart<br>0b10: ABS Scanning<br>0b11: ABS Reliability | It shall be included in the AAI_SON-ADV message. |
| Unavailable start time (UST) | Start of unavailable time | If Action type = 0b00, 0b01, 0b10), it shall be included in the AAI_SON-ADV message. |
| Unavailable Time Interval (UTI) | Interval of unavailable time | If Action type = 0b11, it may be included in AAI_SON-ADV message. |
| Reason | 0x00: Power down<br>0x01: Power reduction<br>0x10: FA change<br>0x11: Bckhual link down | If Action type = 0b11, it shall be included in the AAI_SON-ADV message. |
| Tx power reduction | dB value of Tx power reduction | If Reason = 0b01, it shall be included in the AAI_SON-ADV message. |
| FA index | FA index | If Reason = 0b10, it shall be included in the AAI_SON-ADV message. |
| Expected power down time or resource adjustment time or current FA downtime | | If Action type = 0b11), it shall be included in the AAI_SON-ADV message. |
| Expected uptime or new FA uptime | | If Action type = 0b11), it may be included in the AAI_SON-ADV message. |
| Recommended BSID list | Recommended BSID list | It may be included in AAI_SON-ADV message to help AMS to HO. |

Referring to Table 1, the AAI_SON-ADV message includes an Action Type field which may indicate an action that the ABS will take. In accordance with the present invention, the Action Type field is preferably set to a value indicating ABS scanning (i.e. 0b10).

The AAI_SON-ADV message also includes a UTI field to specify a time interval during which AMSs are not scheduled. An Unavailable start time (UST) field may indicate the start of the UTI.

A description will be made of a procedure for updating a neighbor list using the above-described AAI_SON-ADV message with reference to FIG. 3.

Figure 3:
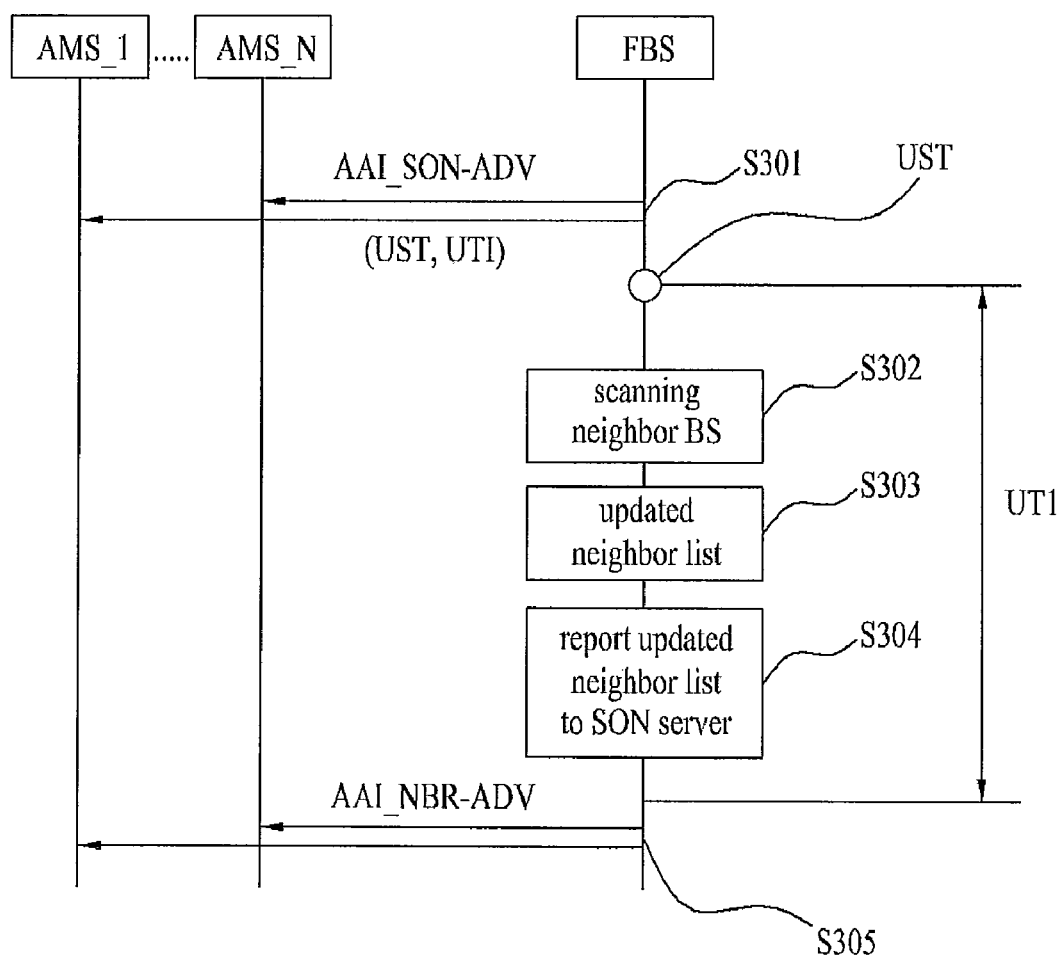
FIG. 3 is a diagram illustrating a signal flow for updating a neighbor list at an FBS according to an exemplary embodiment of the present invention.

FIG. 3 is a diagram illustrating a signal flow for updating a neighbor list at an FBS according to an exemplary embodiment of the present invention.

Referring to FIG. 3, an FBS may broadcast an AAI_SON-ADV message including information about an SCI or UTI and a UST for scanning in order to update a neighbor list in step S301.

Upon receipt of the AAI_SON-ADV message, AMSs AMS 1 to AMS n may be aware of the SCI of the FBS and the start time of the SCI from the information included in the AAI_SON-ADV message, considering that no scheduling will be performed by the FBS during the SCI.

At the start of the SCI (i.e. the UST), the FBS may scan neighbor BSs by receiving Advanced Preambles (A-Preambles) from the neighbor BSs in step S302.

According to the result of the scanning, the FBS may update its neighbor list in step S303.

In step 304, the FBS may report information about the updated neighbor list (e.g. BSIDs, RSSIs, etc.) to a SON server.

After updating the neighbor list, the FBS may broadcast an AAI_NBR-ADV message including the updated neighbor list to the AMSs, AMS 1 to AMS n in step S305.

SCI Setting

According to another aspect of the present invention, the FBS may take into account its Low Duty Cycle (LDC) or LDCs of neighbor BSs, when setting an SCI. LDM of the FBS according to the present invention will be described below.

According to the present invention, besides normal operation mode, the FBS may enter LDM to save power and reduce interference to neighbor cells.

The LDM is composed of an Available Interval (AI) and an Unavailable Interval (UAI). The FBS operates during each interval as follows.

During an AI, the FBS may become active on the air interface for activities such as paging, system information transmission, ranging, or data traffic transmission. Specifically, the FBS may transmit a synchronization channel and/or a SuperFrame Header (SFH) to AMSs on a downlink during the AI. In addition, the FBS may monitor an access attempt of an AMS, for example, transmission of a ranging code from the AMS during a predetermined uplink period.

During a UAI, the FBS does not transmit signals on the air interface to thereby mitigate interference to neighbor FBSs or MBSs that use the same frequency band and save power. In addition, the FBS may synchronize its timing with an overlay MBS to which it belongs or measure interference from neighbor cells.

One AI and one UAI are collectively referred to as an LDC, for the convenience' sake in the present invention.

A sequence of AIs and UAIs may form an LDM pattern. A default LDM pattern may be the iteration of one AI and one UAI. When entering the LDM, the FBS may activate a default LDM pattern. There may be one or more default LDM patterns for the FBS.

Once each FBS is initially deployed, it sets basic network information by authentication with a core network. If the FBS has knowledge of location information about an area in which it has been deployed, it may initially receive a list of BSs estimated as its neighbor BSs from the core network.

In accordance with another aspect of the present invention, the FBS also receives information about the LDCs and LDM patterns of neighbor FBSs so that it may set its SCI not to overlap with the SCIs of the neighbor FBSs. On the assumption that the FBS receives this information from the core network, SCI setting is considered in the following three ways.

Case 1) Neighbor FBSs Follow One Default LDM

Figure 4:
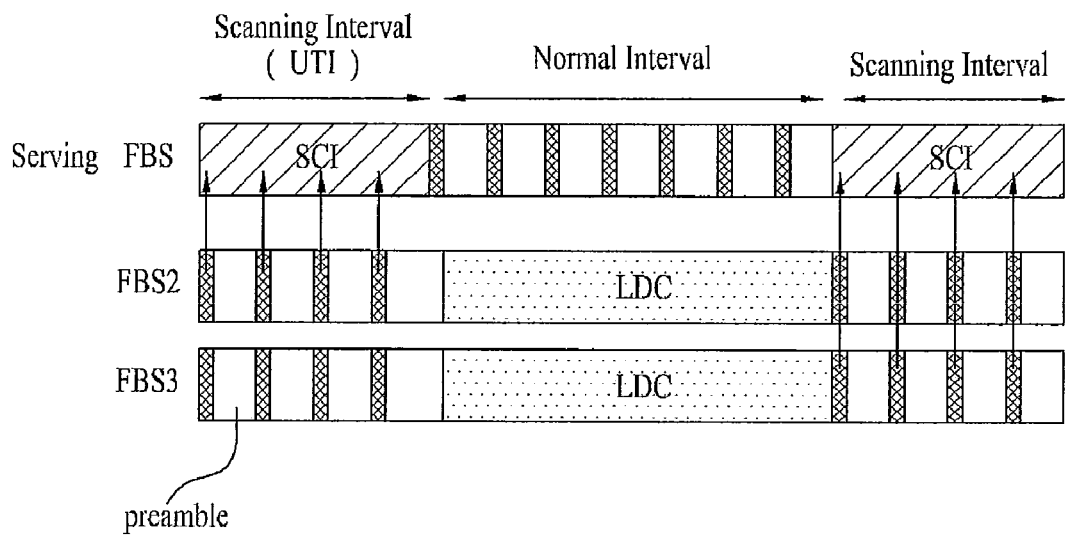
FIG. 4 illustrates an operation for setting a scanning interval according to an exemplary embodiment of the present invention.

FIG. 4 illustrates an operation for setting an SCI according to an exemplary embodiment of the present invention.

Referring to FIG. 4, when neighbor FBSs operate based on the same LDM pattern, an FBS may set an SCI in such a manner that the SCI is not overlapped with a time interval during which the neighbor FBSs operate in LDM, especially UAIs of the neighbor FBSs. During the UAIs, the neighbor FBSs do not transmit any signal in the air interface and thus the FBS cannot receive preambles from the neighbor FBSs.

Case 2) The FBS Uses its LDC

Figure 5:
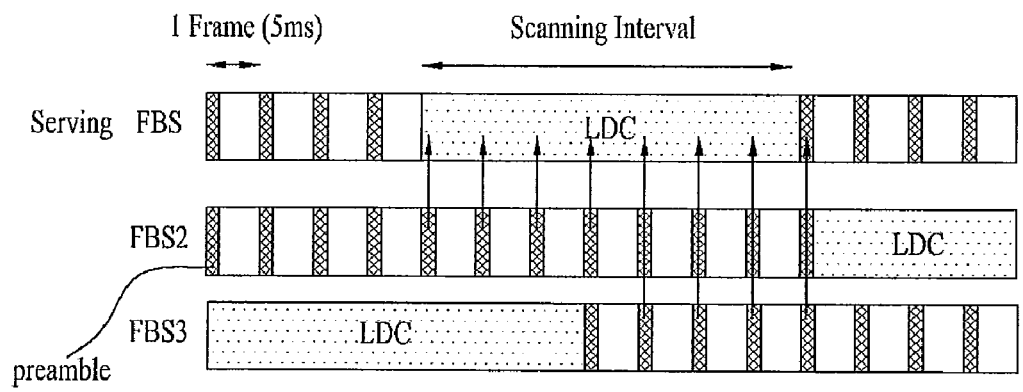
FIG. 5 illustrates an operation for setting a scanning interval according to another exemplary embodiment of the present invention.

FIG. 5 illustrates an operation for setting an SCI according to another exemplary embodiment of the present invention.

Referring to FIG. 5, an SCI may be set such that the FBS is supposed to scan neighbor FBSs during its UAI in LDM. In this case, the FBS preferably sets its UAI not to overlap with the LDCs of the neighbor FBSs, especially UAIs of the neighbor FBSs. Since the FBS scans the neighbor FBSs during the UAI of its LDC, it may not indicate its SCI to AMSs by an AAI_SON-ADV message.

Case 3) Transition from LDM to Active Mode

Figure 6:
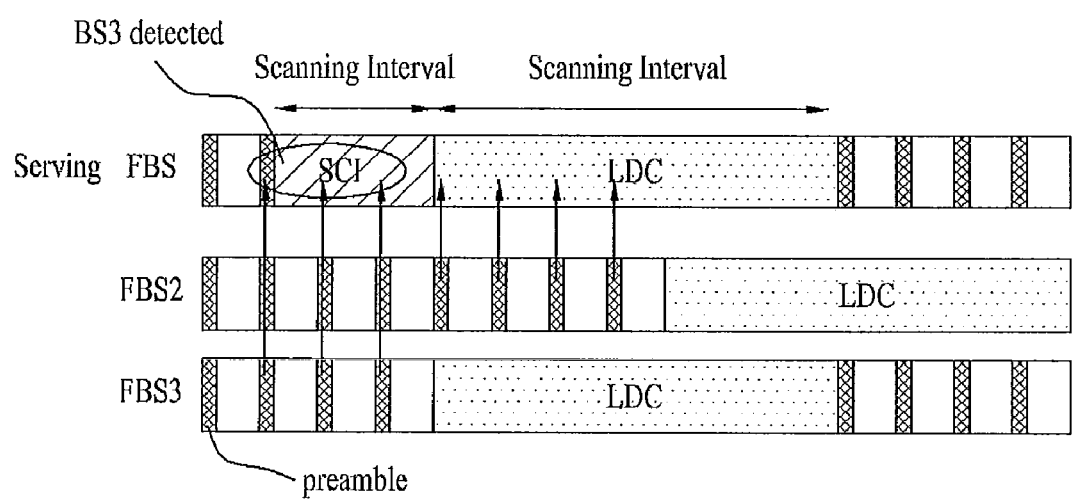
FIG. 6 illustrates an operation for setting a scanning interval according to a further exemplary embodiment of the present invention.

FIG. 6 illustrates an operation for setting a scanning interval according to a further exemplary embodiment of the present invention.

Referring to FIG. 6, when the FBS operates in LDM and the current LDC of the FBS overlaps with at least one of the LDCs of the neighbor FBSs, the FBS may transition to active mode, set an SCI, notify AMSs of the SCI, and then start to scan the neighbor FBSs during the SCI. Specifically, the LDC of a third FBS (FBS3) overlaps with the LDC of a serving FBS in FIG. 6. Therefore, the serving FBS may set an SCI such that the SCI is positioned before the start of the LDC of FBS3 and then scan FBS3 during the SCI. Thereafter, during its LDC, the serving FBS may scan neighbor FBSs (e.g. a second FBS (FBS2)) whose LDCs do not overlap with the LDC of the serving FBS.

Embodiment 2

In the above-described embodiment, an FBS may provide up-to-date network topology information to AMSs by making or updating its neighbor list through scanning of neighbor BSs.

The FBS detects the neighbor BSs via the air interface, unlike a macro cell. Hence, if a detected neighbor BS is to be accepted as a neighbor BS or does not satisfy a predetermined criterion, a trigger condition is needed to add or delete the BS to or from the neighbor list. The same thing applies to AMSs's scanning for the FBS. For example, as described before with reference to FIG. 2, upon receipt of a request for network topology information from an FBS, an AMS may start to scan neighbor BSs and report only neighbor BSs satisfying the trigger condition among the detected neighbor BSs to the FBS.

Accordingly, a neighbor list update/report trigger condition will be provided according to another embodiment of the present invention.

Table 2 below illustrates an exemplary report trigger condition for an AMS that has received a scanning request according to another embodiment of the present invention.

TABLE 2

| Name | Length (bits) | Value |
|---|---|---|
| Cell type | 2 (MSB) | Femtocell type0x00: Macro Cell0x01: Relay Station0x10: OSG/CSG-closed0x11: CSG-open |
| Metric Type | 2 | Trigger metric type: 0x0: CINR metric0x1: RSSI metric0x2: RTD metric0x3: Missed frames |
| Function | 3 | Computation defining trigger condition: 0x0: Reserved 0x1: Metric of neighbor femtocell BS is greater than absolute value 0x2: Metric of neighbor femtocell BS is less than absolute value 0x3: Metric of neighbor femtocell BS is greater than serving BS metric by relative value 0x4: Metric of neighbor femtocell BS is less than serving BS metric by relative value 0x5: Metric of serving femtocell BS greater than absolute value 0x6: Metric of serving femtocell BS less than absolute value 0x7: Reserved |
| Action | 1 (LSB) | Action performed upon reaching trigger condition: 0x0: Do not report0x1: Respond on trigger with AAI_SCN-REP |

Referring to Table 2, the report trigger condition is that a report is transmitted according to the magnitude of a metric value with respect to a predetermined absolute value according to a cell type and a metric type.

According to a further aspect of the present invention, when an FBS scans neighbor BSs on its own according to the afore-described embodiment, a triggering criterion for deleting a BS from a neighbor list is provided.

When the FBS scans neighbor BSs, it may use a scan counter (hereinafter, referred to as a report chance counter) for each neighbor listed in the neighbor list. If the FBS fails to receive a preamble from a particular neighbor BS during an SCI, it increases a report chance count for the neighbor BS by 1, starting from 0. When the report chance count reaches a predetermined threshold, it is decremented by 1 each time. If the report chance count eventually reaches 0 for the neighbor BS, the FBS may delete the neighbor BS from the neighbor list, which will be described below with reference to FIG. 7.

Figure 7:
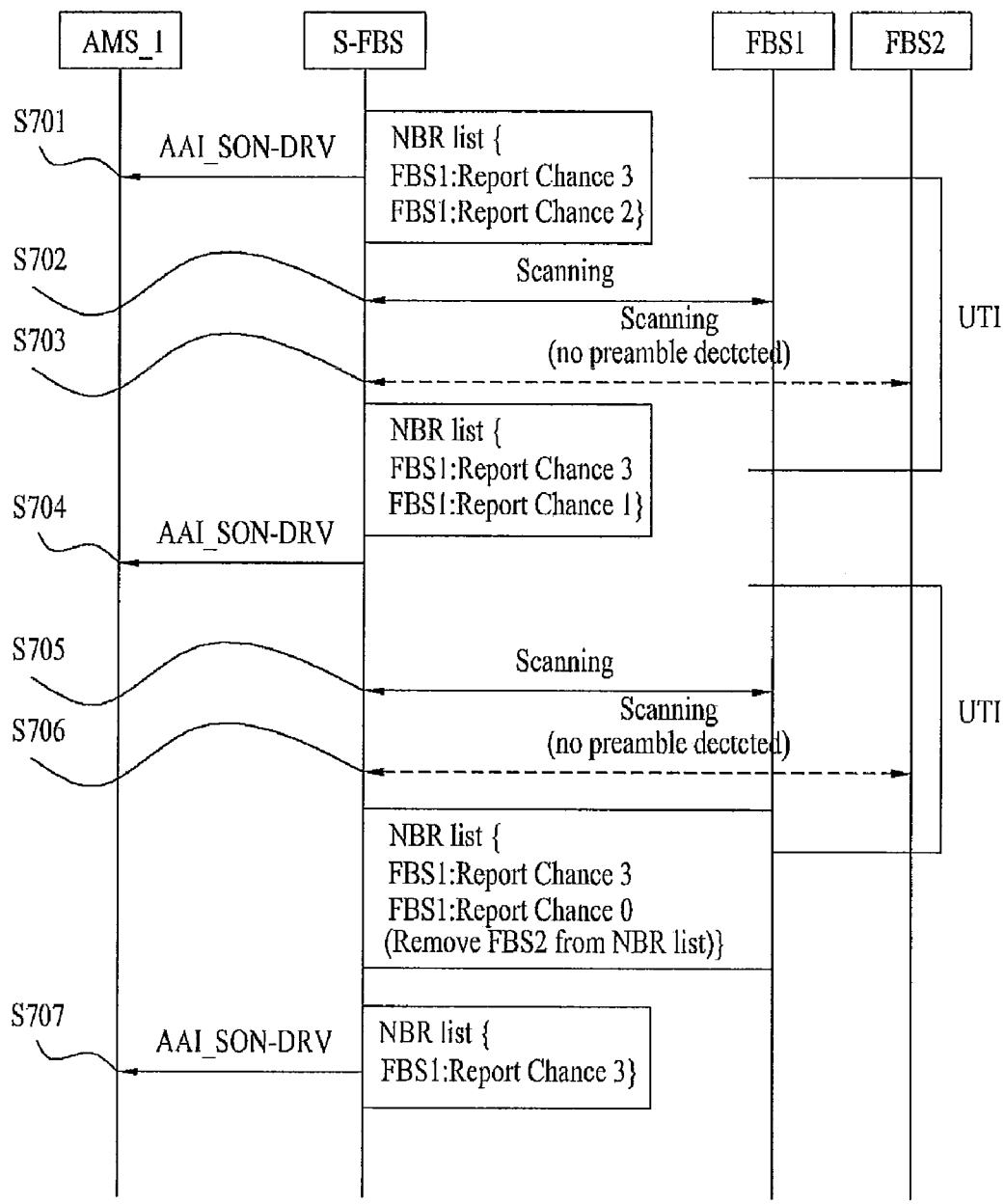
FIG. 7 is a diagram illustrating a signal flow for a procedure for deleting a specific neighbor BS from a neighbor list according to an exemplary embodiment of the present invention.

FIG. 7 is a diagram illustrating a signal flow for a procedure for deleting a specific neighbor BS from a neighbor list according to an exemplary embodiment of the present invention.

In the illustrated case of FIG. 7, it is assumed that an FBS has a neighbor list including first and second FBSs (FBS1 and FBS2), a report chance count for each neighbor BS starts from 3, decrementing by 1 each time a preamble from the neighbor BS is not detected during an SCI, and the neighbor BS is deleted from the neighbor list if the report chance count is 0.

On the above assumption, the FBS may broadcast an AAI_SON-ADB message including information about a UTI and a UST in order to update its neighbor list in step S701.

In steps S702 and S703, the FBS scans neighbor BSs including FBS1 and FBS2 during the SCI but fails to receive a preamble from FBS2.

Therefore, the FBS decreases a report chance count for FBS2 by 1 in the neighbor list.

When the next SCI comes or when needed, the FBS may broadcast an AAI_SON-ADV message again to thereby indicate to AMSs that the FBS will scan neighbor BSs in step S704.

In steps S705 and S706, the FBS scans neighbor BSs including FBS1 and FBS2 during the SCI but fails to receive a preamble from FBS2 again.

Therefore, the FBS decreases the report chance count for FBS2 by 1 in the neighbor list. Hence, the report change count for FBS2 is 0 and FBS2 is deleted from the neighbor list.

The FBS then includes only FBS1 in the periodically broadcast AAI_SON-ADV message in step S707.

Configurations of AMS and ABS or MBS

An AMS and an FBS (or MBS) for implementing the above-described embodiments according to an exemplary embodiment of the present invention will be described below.

The AMS operates as a transmitter on an uplink and as a receiver on a downlink, whereas the ABS operates as a receiver on the uplink and as a transmitter on the downlink. Therefore, each of the AMS and the ABS may have a transmitter and a receiver for transmitting and receiving information or data.

Each of the transmitter and the receiver may include a processor, modules, parts and/or means for performing the exemplary embodiments of the present invention. Particularly, the transmitter and the receiver may include modules (or means) for encrypting messages, modules for interpreting encrypted messages, and antennas for transmitting and receiving messages. An example of the transmitter and the receiver will be described with reference to FIG. 8.

Figure 8:
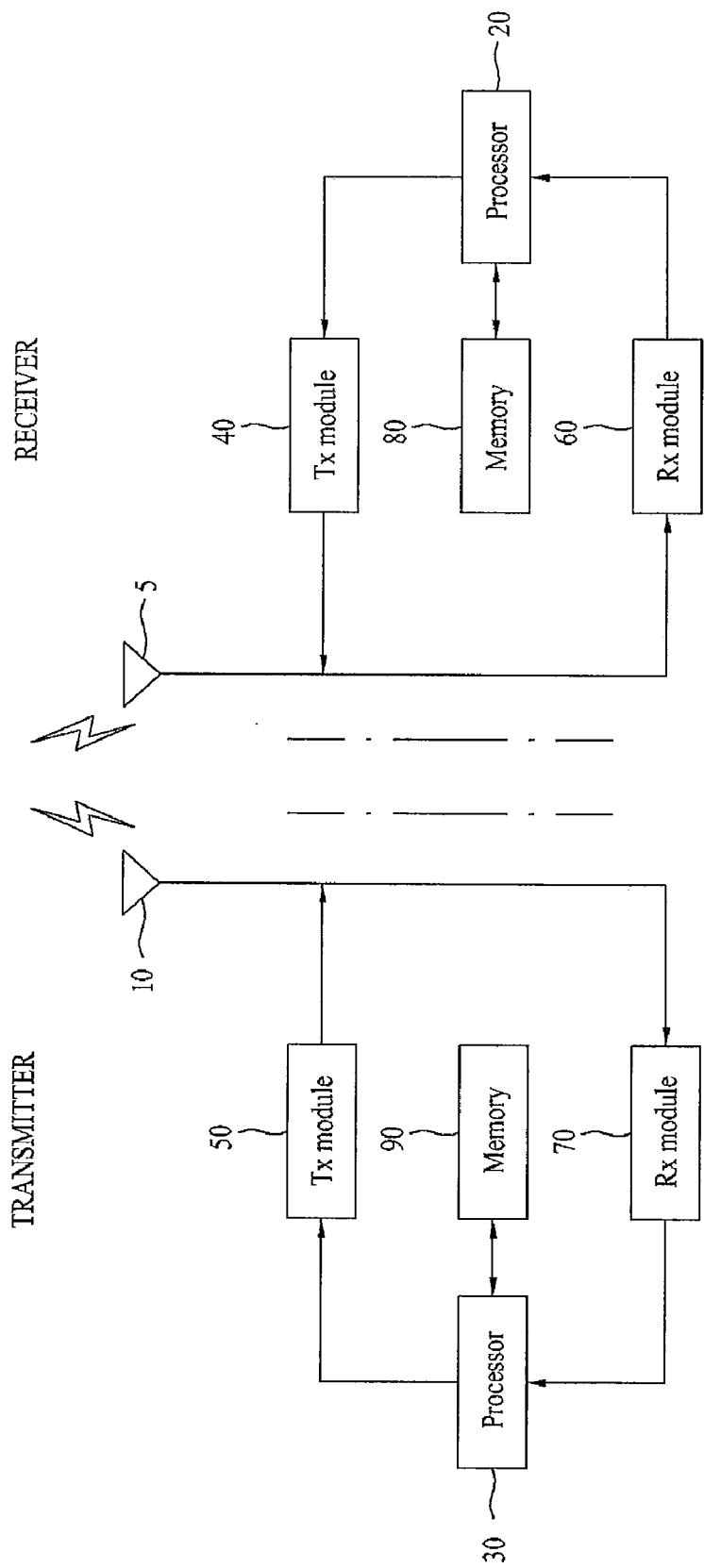
FIG. 8 is a block diagram of a transmitter and a receiver according to an exemplary embodiment of the present invention.

FIG. 8 is a block diagram of a transmitter and a receiver according to an exemplary embodiment of the present invention.

Referring to FIG. 8, the structures of the transmitter and the receiver are illustrated on the left and right sides of FIG. 8, respectively. Each of the receiver and the transmitter may include an antenna 5 or 10, a processor 20 or 30, a Transmission (TX) module 40 or 50, a Reception (Rx) module 60 or 70, and a memory 80 or 90. Each component of the transmitter operates in correspondence with its counterpart of the receiver.

The antennas 5 and 10 transmit Radio Frequency (RF) signals generated from the Tx modules 40 and 50 in the air interface, or receive RF signals in the air interface and output the received RF signals to the Rx modules 60 and 70. When Multiple Input Multiple Output (MIMO) is supported, two or more antennas may be used.

An antenna, a Tx module and an Rx module may collectively form an RF module.

The processors 20 and 30 provide overall control to the AMS. For example, the processors 20 and 30 may perform a control function, a MAC frame conversion control function based on service characteristics and propagation environments, a handover function, authentication, and encryption in order to perform the afore-described exemplary embodiments. More specifically, the processors 20 and 30 may provide overall control to perform the above-described scanning procedures.

Especially a processor of the ABS may determine whether to scan neighbor BSs to update its neighbor list. When determining to scan, the processor of the ABS may determine an UTI and a UST for scanning and broadcast an AAI_SON-ADV message including the UTI and UST through an RF module.

Then the processor of the FBS may scan the neighbor BSs during the UTI or SCI by detecting and receiving preambles from the neighbor BSs.

The processor of the FBS may update the neighbor list according to the result of the scanning and transmit information about the updated neighbor list to a SON server or broadcast the updated neighbor list in an AAI_NBR-ADV message.

The processor of the FBS may set an SCI, taking into account LDM patterns of neighbor FBSs, such that the SCI is not overlapped with UAIs of the neighbor FBSs. If the processor of the FBS fails to detect a specific BS included in the neighbor list a predetermined number of times, it may delete the BS from the neighbor list.

An overall control may be provided to operations according to the exemplary embodiments of the present invention, referring to FIGS. 3 to 7 for details of the operations of the processor.

The Tx modules 40 and 50 may transmit data scheduled by the processors 20 and 30 to the antennas 5 and 10, after a predetermined coding and modulation.

The Rx modules 60 and 70 may recover original data by decoding and demodulating RF signals received through the antennas 5 and 10 over the air interface and output the original data to the processors.

The memories 80 and 90 may store programs for processing and control operations of the processors 20 and 30 and temporarily store input/output data (e.g. scanning results or a neighbor list). Also, the memories 80 and 90 may include at least one of a flash memory-type storage medium, a hard disc-type storage medium, a multimedia card micro-type storage medium, a card-type memory (e.g. a Secure Digital (SD) or extreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, and optical disk.

The ABS may perform, in at least one of the above-described modules or in a separately procured means, module or part, a control function according to the embodiments of the present invention, an Orthogonal Frequency Division Multiple Access (OFDMA) packet scheduling, Time Division Duplex (TDD) packet scheduling, channel multiplexing, a variable MAC frame control function based on service characteristics and a propagation environment, a real-time high-speed traffic control function, a handover function, an authentication and encryption function, a packet modulation and demodulation function for data transmission and reception, a high-speed packet channel coding function, and a real-time modem control function.

What is claimed is:

1. A method for updating a neighbor list at a femto Base Station (BS), the method comprising:
broadcasting, at the femto BS, a first broadcast message including an Unavailable Start Time (UST) field indicating a start of an unavailable time and an Unavailable Time Interval (UTI) field indicating an interval of the unavailable time;
scanning, at the femto BS, at least one neighbor BS during the unavailable time indicated by the Unavailable Start Time field and the Unavailable Time Interval field; and
updating, at the femto BS, the neighbor list according to a result of the scanning.

2. The method according to claim 1, wherein the unavailable time is time duration during which scheduling is not performed for Mobile Stations (MSs) by the femto BS.

3. The method according to claim 1, wherein the scanning comprises receiving a preamble from the at least one neighbor BS.

4. The method according to claim 1, further comprising broadcasting a second broadcast message including the updated neighbor list.

5. The method according to claim 4, further comprising reporting at least part of information about the updated neighbor list to a Self Organizing Network (SON) server.

6. The method according to claim 4, wherein the first broadcast message is an Advanced Air Interface Self Organizing Network Advertisement (AAI_SON-ADV) message and the second broadcast message is an Advanced Air Interface Neighbor Advertisement (AAI_NBR-ADV) message.

7. The method according to claim 1, wherein the unavailable time is set not to overlap with a Low Duty Cycle (LDC) of a neighbor femto BS.

8. A femto Base Station (BS) comprising:
a processor; and
a Radio Frequency (RF) module for transmitting and receiving RF signals in the air interface under the control of the processor,
wherein the processor controls a first broadcast message including an Unavailable Start Time (UST) field indicating a start of an unavailable time and an Unavailable Time Interval (UTI) field indicating an interval of the unavailable time to be broadcast, controls at least one neighbor BS to be scanned during the unavailable time indicated by the Unavailable Start Time field and the Unavailable Time Interval field, and controls the neighbor list to be updated according to a result of the scanning.

9. The femto BS according to claim 8, wherein the unavailable time is time duration during which scheduling is not performed for Mobile Stations (MSs) by the femto BS.

10. The femto BS according to claim 8, wherein the processor controls the at least one neighbor BS to be scanned by receiving a preamble from the at least one neighbor BS.

11. The femto BS according to claim 8, wherein the processor controls a second broadcast message including the updated neighbor list to be further broadcast.

12. The femto BS according to claim 11, wherein the first broadcast message is an Advanced Air Interface Self Organizing Network Advertisement (AAI_SON-ADV) message and the second broadcast message is an Advanced Air Interface Neighbor Advertisement (AAI_NBR-ADV) message.

13. The femto BS according to claim 8, wherein the processor sets the unavailable time not to overlap with a Low Duty Cycle (LDC) of a neighbor femto BS.

* * * * *